United States Patent [19]
Herman et al.

[11] Patent Number: 5,766,450
[45] Date of Patent: Jun. 16, 1998

[54] APPARATUS FOR MAGNETICALLY FILTERING WASTEWATERS CONTAINING OIL-COATED MILL SCALE

[75] Inventors: Stewart T. Herman, Hellertown; Robert L. Greenawalt, Ottsville, both of Pa.; Richard W. Faupel, Sebring, Fla.

[73] Assignee: Bethlehem Steel Corporation

[21] Appl. No.: 719,747

[22] Filed: Sep. 25, 1996

[51] Int. Cl.⁶ .................................................. B01D 35/06
[52] U.S. Cl. .......................... 210/108; 210/222; 210/267; 210/274; 210/275
[58] Field of Search ................................ 210/107, 108, 210/143, 222, 223, 263, 274, 275, 695, 741, 745, 267, 276–278, 411, 425, 427; 209/224, 228, 232; 96/2, 1; 95/27

[56] References Cited

U.S. PATENT DOCUMENTS

| | | | |
|---|---|---|---|
| 2,430,157 | 11/1947 | Byrd, Jr. | 210/222 |
| 3,539,509 | 11/1970 | Heitmann et al. | 210/222 |
| 3,581,895 | 6/1971 | Howard | 210/108 |
| 3,873,448 | 3/1975 | Isberg et al. | 210/222 |
| 4,087,358 | 5/1978 | Oder | 210/222 |
| 4,190,524 | 2/1980 | Watson | 209/213 |
| 4,462,906 | 7/1984 | Inaba | 210/222 |
| 4,594,160 | 6/1986 | Heitmann et al. | 210/222 |
| 4,784,758 | 11/1988 | Willis | 210/695 |
| 4,904,381 | 2/1990 | Urakami | 210/223 |
| 5,019,272 | 5/1991 | Kurahashi et al. | 210/223 |
| 5,534,155 | 7/1996 | Schimion et al. | 210/695 |

FOREIGN PATENT DOCUMENTS

| | | | |
|---|---|---|---|
| 949458 | 6/1974 | Canada | 210/745 |

OTHER PUBLICATIONS

Eriez Magnetics Publication OTB-440C dated 1992, Title: High Intensity Magnetic Filter.

*Primary Examiner*—Matthew O. Savage
*Attorney, Agent, or Firm*—Harold I. Masteller, Jr.

[57] ABSTRACT

Electro-magnetic filter apparatus and method of operating to separate and remove oily magnetic solids from wastewaters. The filter apparatus includes a filter assembly having an electro-magnetic coil that encircles a canister. The canister has an interior space defined by a wall surface and a first perforated baffle spaced apart from a second perforated baffle. The interior space contains a ferromagnetic matrix comprising split ring lock washers. The feed side end portion of the canister communicates with the wastewater source that contains the oily magnetic solids, a wash-water supply, a pressurized air supply and a disposal stream. The discharge side end portion of the canister communicates with a recycling stream, the disposal stream and the wash-water supply. A feed side valve arrangement selectively introduces the wastewater into the feed side end portion of the canister during filtering operations, and selectively injects a pressurized air/wash-water mixture from the wash-water and pressurized air supply into the feed side end portion of the matrix canister during up-flow backwashing operations. The ferromagnetic matrix is fluidized by the pressurized air/wash-water mixture the during the up-flow backwashing. A discharge side valve arrangement selectively discharges clean effluent through the recycling stream during filtering or introduces water, from the wash-water supply, into the discharge end portion of the matrix canister during down-flow backwashing.

14 Claims, 6 Drawing Sheets

APPARATUS FOR MAGNETICALLY FILTERING WASTEWATERS CONTAINING OIL-COATED MILL SCALE

BACKGROUND OF THE INVENTION

This invention is directed to apparatus and a method for removing oil-coated mill scale from wastewaters, and more particularly, it is directed to magnetically removing oil-bearing suspended solids from recirculating cooling waters in a Hot Strip Mill (HSM).

Large quantities of water are used at Hot Strip Mill operations. For example, water is used as a coolant to control the temperature of the work rolls. Controlling roll temperature improves both service life and product quality. If allowed to go uncontrolled, excessive roll temperatures tend to reduce surface hardness in the work rolls and produce increased roll surface wear. Increased bearing failures also occur because of excessive roll temperatures. As roll temperature increases, the work roll expands along its longitudinal axis and exerts lateral forces against the bearing mechanisms. The increased lateral forces cause the bearings to wear prematurely.

Overheated work rolls also reduce product quality. As pointed out above, excessive roll temperatures causes dimensional instability as the work rolls expand under the higher temperatures. In addition to expanding longitudinally, overheated rolls also expand diametrically and thereby reduce the gap between the opposed work rolls. The increased roll diameter, or reduced roll gap, produces a finished product that is thinner than the desired thickness or gauge.

Water is also used in high pressure jet sprays located within the HSM. The high pressure jet sprays blast scale from the surface of the raw, unfinished product prior to its rolling. The jet sprays clean the hot steel surface to remove any scale buildup to prevent scale from becoming imbedded within the product surface during the rolling operation. The jet blasted mill scale and water fall into a flume or sluice, located beneath the mill stands, where they are mixed with other mill wastewaters and sediments such as thick lubricating oils, chips and debris. The wastewaters carry the accumulated oily mixture of mill scale and solids to a collection point where the wastewater is filtered for recycling back into the HSM cooling water stream.

Hot Strip Mill sediments comprise a thick oily mixture of iron oxides, ferrous chips and lubricants. Such oil-bearing solids are very difficult to filter from the collected wastewaters because they clog all known filter matrices In an attempt to develop effective filtration of HSM wastewaters, pilot tests were conducted at a 68 inch wide Hot Strip Mill using an "ERIEZ" 2500 gauss high intensity magnetic filter. It appeared reasonable that magnetic filtration would be suitable for removing ferrous mill scale from the wastewaters. However, the pilot scale tests proved disappointing. A portion of the wastewater short circuited the Eriez filter matrix and produced much lower removal efficiencies than expected. In addition, the thick oily mill scale mixture adhered to the filter matrix causing it to clog. This further reduced the removal rate by causing an even greater flow of wastewater to short circuit the matrix.

Various known backwashing procedures were tried in an attempt to purge the oily solids from the clogged filter matrix. The backwashing attempts proved to be ineffective because the thick oily solids clung fast to the matrix and could not be flushed out during backwashing. Eventually, the matrix became so clogged with oily solids that the filter had to be taken off line.

Such ineffective filtration practice can force oily mill scale and solids back into the HSM cooling water stream along with the recycled wastewater. As heretofore disclosed, these oily solids will cause premature wear and damage to the mill, and they will adversely affect product quality if they are rolled into the surface of the product.

SUMMARY OF THE INVENTION

It is therefore the object of this invention to provide a magnetic filter assembly having an improved filter matrix for removing oily-solids from wastewaters and an improved backwashing method to purge oily-solids from the matrix.

It is a further object of this invention to provide an improved matrix core to reduce short circuiting of wastewaters during filtration and to facilitate purging of oily-solids during backwashing.

It is a still further object of this invention to provide means to agitate a filter matrix during backwashing to improve purging of oily solids.

And finally it is a still further object of this invention to provide an improved method for backwashing filter matrix to purge oily-solids.

I have discovered that the foregoing objects can be attained by providing electromagnetic filter apparatus and a method that includes a filter assembly having an electromagnetic coil that encircles a canister. The canister has an interior space defined by a wall surface, a first perforated baffle and a second perforated baffle and the interior space contains a ferromagnetic matrix comprising split ring lock washers. The feed side end portion of the canister communicates with the wastewater source that contains the oily magnetic solids, a wash-water supply, and a pressurized air supply. It also includes a disposal stream to discharge a downflow backwash for further treatment. The discharge side end portion of the canister communicates with a recycling stream, a disposal stream, and a wash-water supply for backwashing the filter matrix. A feed side valve arrangement selectively introduces the wastewater into the feed side end portion of the canister during filtering operations, selectively injects a pressurized air/wash-water mixture from the wash-water and press the matrix canister during up-flow backwashing operations, and selectively allows the discharge of wash-water during the down-flow backwashing operation. The ferromagnetic matrix is fluidized by the pressurized air/wash-water mixture the during the backwashing. A discharge side valve arrangement selectively allows the discharge of the cleaned water to the recycle stream during the filtering cycle, introduces wash-water into the canister during the downflow phase of the backwash cycle, and allows the discharge for further treatment of air and water from the up-flow phase of the backwash cycle.

DETAILED DESCRIPTION OF THE PREFERRED EMBODIMENT

Figure 1:
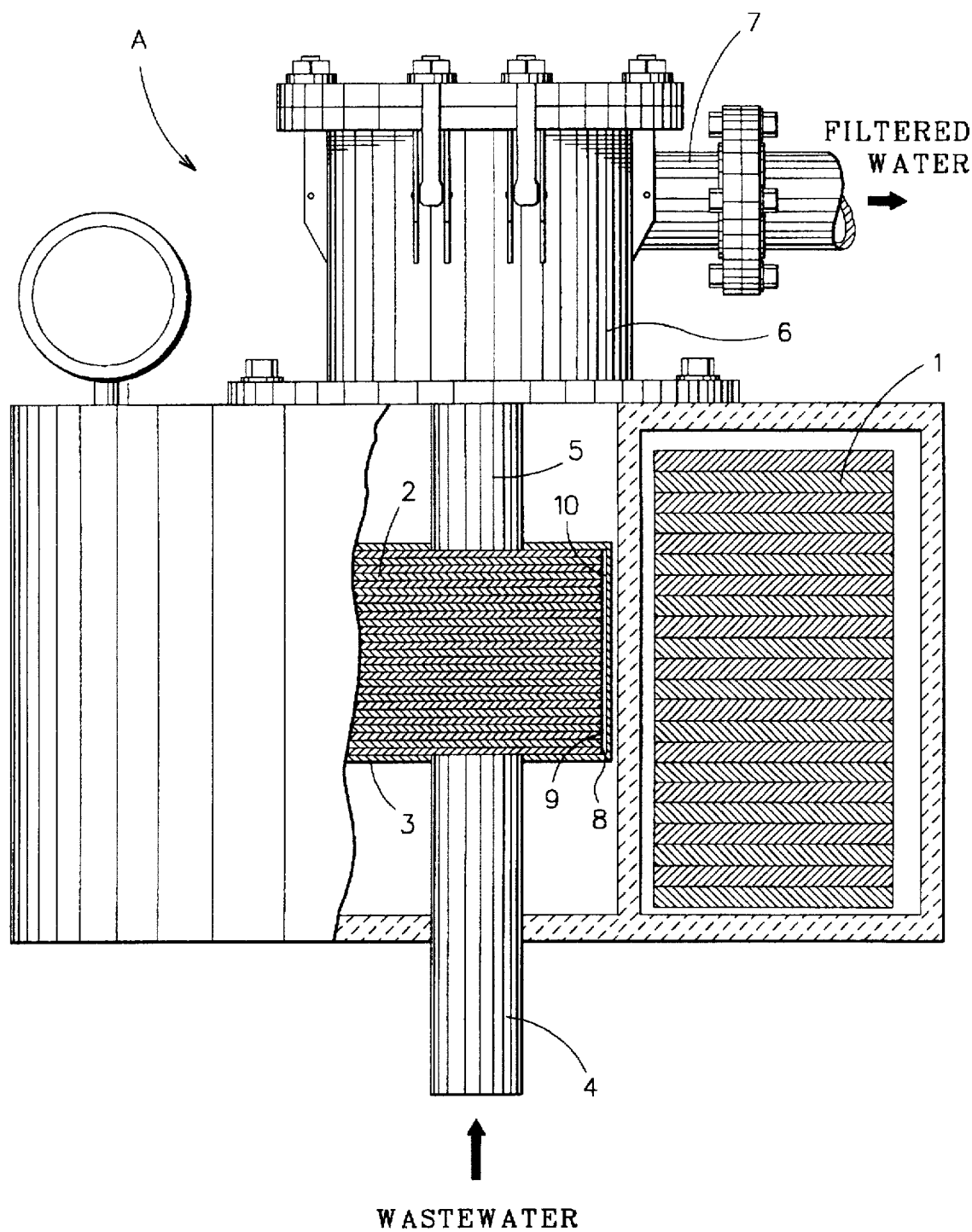
FIG. 1 is a cross-section view of the prior art.

Referring to FIG. 1 labeled "Prior Art", the drawing illustrates an Eriez electro-magnetic filter "A" similar to the filter used in pilot scale tests conducted at a 68 inch wide Hot Strip Mill. The pilot scale tests were conducted to develop an electro-magnetic filter and system capable of removing oily solids from HSM wastewaters. The HSM wastewaters were filtered through a six inch diameter matrix at a flow rate of about 15–35 gpm. This equates to hydraulic loading of about 75–180 gpm of wastewater per square foot of matrix cross sectional area with a preferred rate of about 130 gpm of wastewater per square foot of matrix cross sectional area. The clean wastewater was then recycled back into the cooling water stream of the rolling mill after filtering. The Eriez filter "A" comprises an electromagnetic coil 1 surrounding a tightly compressed stack of expanded metal disks 2 housed within a matrix canister 3. An inlet line 4 is attached to one side of the matrix canister 3 to provide a feed line from a wastewater collection site (not shown). The wastewater received from the collection site includes a mixture of HSM wastewaters, mill lubricants, and oily mill scale and solids from the rolling operations. A discharge line 5 is also attached to the matrix canister 3 for discharging filtered wastewater into a discharge head 6 and line 7 for recycling back into the cooling water stream of the HSM.

The Eriez brochure *High Intensity Magnetic Filter*, published in 1992, teaches that the expanded metal disks 2 provide a filter matrix that amplifies the background magnetic field, produces localized regions of extremely high gradient, and provides a collection site for paramagnetic particle capture. However, as more and more paramagnetic particles become entrained in the matrix 2, back pressure increases on the feed side of the filter and the water flow rate on the discharge side decreases. Continued filtering further clogs the matrix with solids to a point where there is little or no solids removal by the matrix disks 2. If filtration were allowed to continue under such conditions solids could be forced into the discharge line 5 where they are sent back in a recycling stream into the cooling water of the mill. In order to restore the efficiency of the filter, it is necessary to backwash the clogged matrix to clean the collected paramagnetic particles from the tightly packed disks 2. To accomplish this, the electromagnetic coil 1 is de-energized and water is flushed through the matrix to backwash the filter in a direction from the discharge line 5 to the inlet line 4 and purge the entrained solid materials from the matrix 2.

The pilot scale tests revealed various unexpected problems that occur when filtering HSM wastewaters that contain oily mill scale and solids. First, it was discovered that large amounts of the wastewater short circuit the matrix disks 2 as the oily solids begin to clog the disks 2. This short circuiting takes place along a gap 8 located between the outside edge 9 of the stacked matrix disks 2 and the inside wall surface 10 of the matrix canister 3. The short circuiting reduced the expected solids removal rate and introduced solid materials into the HSM cooling water stream. Second, it was discovered that known backwashing procedures failed to remove the sticky oily mixture of solids from the matrix disks. At best, purging of the oily solids was poor, and the filter cycle times between the backwashing cycles became shorter and shorter until ultimately, the filter had to be shut down and taken off line.

Various different filter matrices were tried to overcome the poor backwashing results. For example, the expanded disks were modified and tested to determine whether larger or smaller expanded metal openings improved backwashing results. In addition, an attempt was made to eliminate the short circuiting problem along the gap 8. Some of the modified expanded metal disks 2 were wrapped with gasket material to encircle the disks and fill gap 8 with a gasket or packing. The gasket material eliminated, or at least greatly reduced, the short circuiting of the wastewater along gap 8, and the solids removal rate improved. However, the different size openings of the tested expanded metal disks 2 failed to improve backwashing efficiencies, and clogging of the matrix continued to be a problem. Mill scale continued to became permanently trapped in the matrix, and the filter cycle times become progressively shorter between the backwash cycles. Vigorous backwashing was tried using both air and water to shake the oily solids from the matrix of expanded metal disks. The air/water backwash also failed to effectively purge the trapped solids from the matrix. When consulted, experts in the field continued to advise that the matrix material had to be tightly compressed to provide the best possible filter performance.

Figure 2:
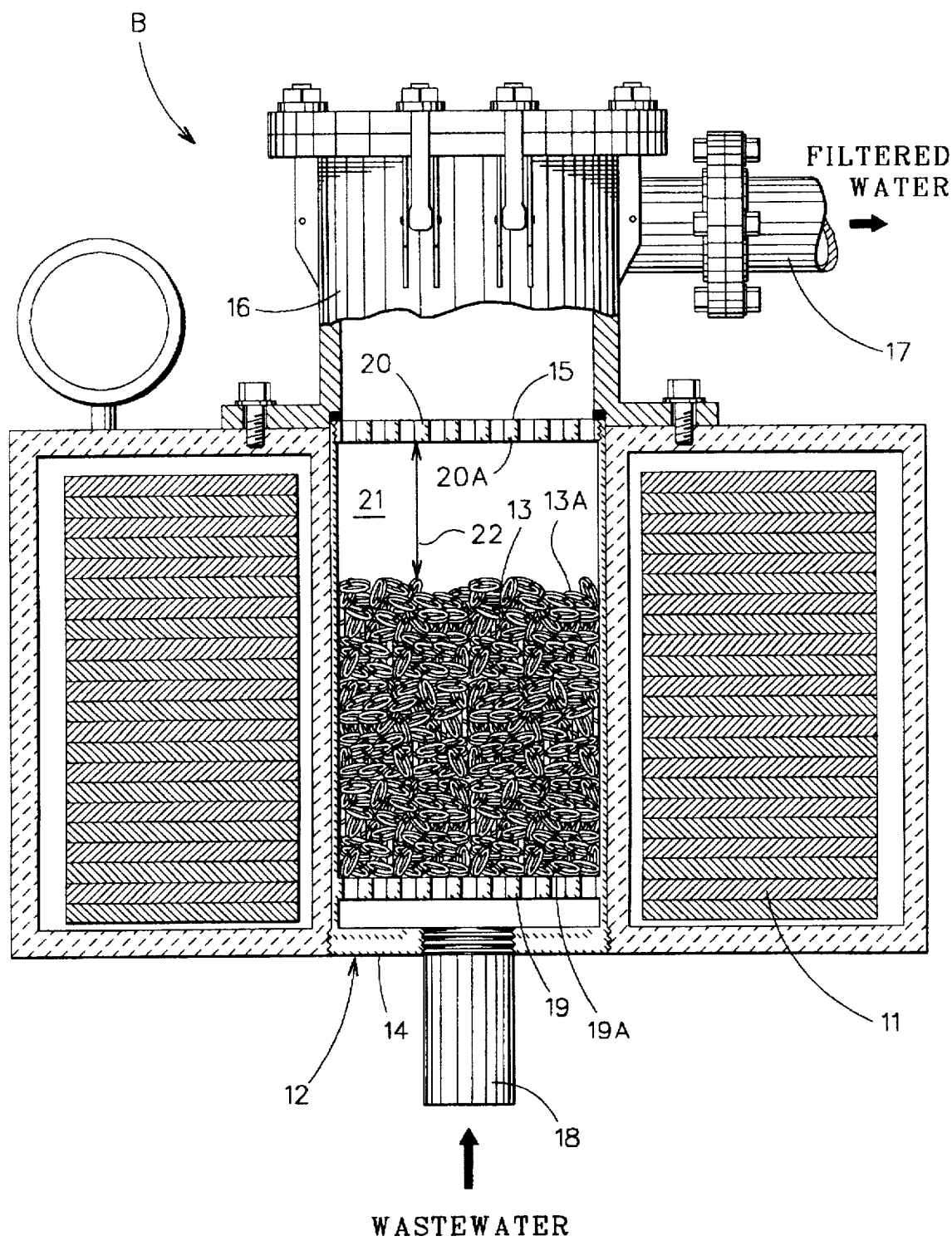
FIG. 2 is a cross-section view of the preferred embodiment of the invention showing a magnetic filter for removing oily solids from a Hot Strip Mill.

Referring to FIG. 2, the preferred embodiment of the invention, an electromagnetic filter "B" is shown comprising an electromagnetic coil 11 that encircles an improved matrix canister 12 containing an improved matrix material 13. Canister 12 includes a feed side end 14 for receiving incoming wastewater and an discharge side end 15 for discharging filtered water. A header 16 receives the filtered water from the discharge side 15 and the filtered water is discharged from the header through line 17 for recycling back into the cooling water stream of the Hot Strip Mill.

A wastewater feed line 18 is attached to the feed side 14 of the matrix canister 12 to deliver the oily solids bearing wastewater from the HSM collection site (not shown), to the electromagnetic filter "B". Canister 12 includes a first perforated baffle or screen 19 located adjacent the feed side end 14 and a second, similar, perforated baffle or screen 20 located adjacent the discharge side 15. The two baffles cooperate to capture the filter matrix 12 within canister 13 and they prevent the filter matrix from being washed into either the feed line 18 or the header 16 and discharge line 17 during filtering and backwashing operations.

As heretofore stated, filter manufactures, and in particular, those skilled in the art of electromagnetic filtering, advise that the filter matrix must be tightly compressed to provide the best possible filter performance. This advice is contrary to the teaching of Isberg, et al., U.S. Pat. No. 3,873,448. Isberg, et al. disclose a magnetic separator having a filter bed of ferromagnetic particles such as tacks, shot balls or the like, preferably 14 to 16 mesh steel shot. The drawings show electromagnetic coils surrounding the filter bed, and the filter bed is contained within a chamber that has sufficient size to provide an open space above the filter bed. According to the drawings, the magnetic separator does not have a tightly compressed filter bed. However Isberg et al. fail to consider the problems that are encountered when oily solids are introduced into a filter bed, and they fail to teach, or even suggest, backwashing methods in combination with specific matrix materials to more effectively purge oily solids from the matrix.

Various ferromagnetic filter matrices were tested to determine if a matrix could be found that would produce optimum filtering and backwashing results. The matrix materials tested included steel shot, roofing nails, "U" shaped bits of wire such as staples, split ring lock washers, and other oddities such as paper clips and beverage bottle caps. The tests also included attempts to improve backwashing by providing means to churn, scrub or agitate the matrix during the backwash cycle.

Figure 3:
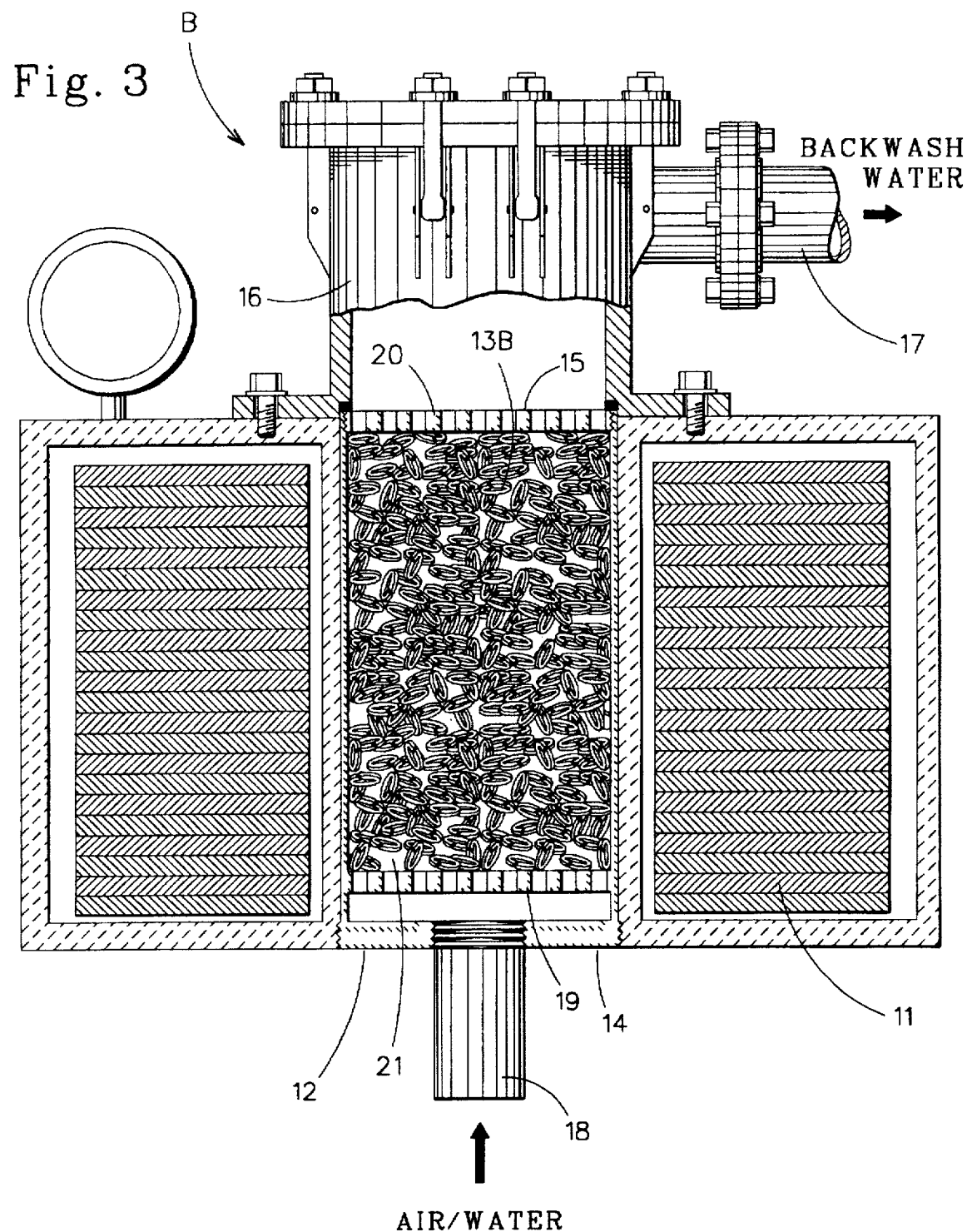
FIG. 3 is a cross-section view similar to FIG. 2 showing a backwash cycle.
Figure 4:
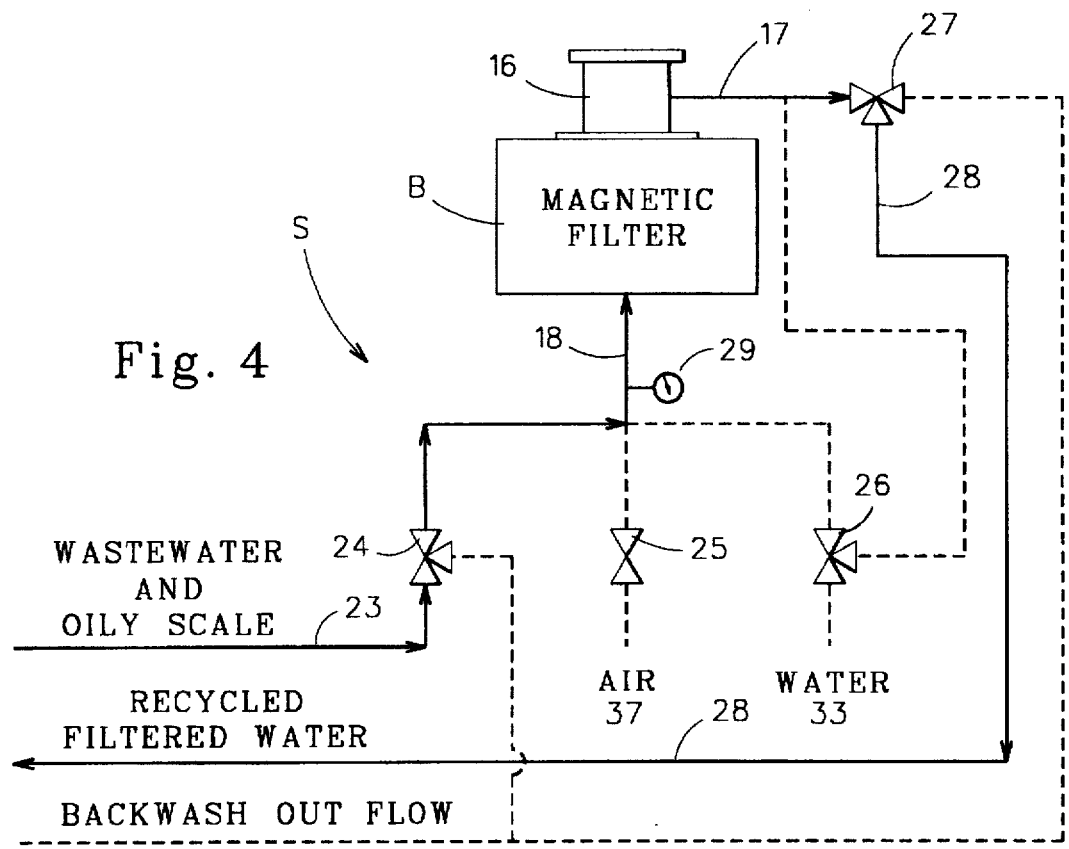
FIG. 4 is a flow diagram showing the filtering cycle of the preferred wastewater filtering system.

Referring now to FIGS. 2, 3 and 4 of the drawings, it was determined that a suitable matrix would require the following properties; a) the matrix had to be highly magnetic, b) it had to provide sufficient void volume to allow for low pressure drop and solids storage, c) it needed to provide a large surface area for solids collection, and finally d) the matrix had to be capable of becoming fluidized during backwashing operations. It was discovered that split ring lock washers, and in particular ⅛ inch diameter split ring lock washers, satisfied all the above requirements. When split ring lock washers were tested as a matrix, solids removal was improved dramatically over other matrix materials tested as shown in the following Table A and Table B.

Table A shows matrix performance for pilot test Run No. 1 and Run No. 4 conducted three hours later. A compressed, expanded metal matrix, shown in FIG. I of the drawings, was used to filter suspended solids from the wastewaters, and the concentration of suspended solids was measured on the feed side (influent) and on the discharge side (effluent) of the pilot test filter. In Table A we see that the filter had to be shutdown after about 45 minutes into the $4_{th}$ run. Shutdown became necessary because, even with matrix backwashing, the concentration of solids became so entrained within the matrix that it became impossible to effectively remove solids from the wastewater. Solids were forced from the filter and into the discharge side of the filter apparatus where they contaminated the discharged effluent with a high concentration of suspended solids. As a result, recycling of the effluent back into cooling stream of the hot strip mill had to be discontinued to prevent mill damage. The increase in suspended effluent solids is shown in Table A as a continuous rise in effluent solids concentration starting with a low measurement reading of 17 at 5 minutes into Run No. 1, and ending with a high measurement reading of 257 after about 45 minutes into the $4_{th}$ run.

Table B shows a second pilot test where a matrix comprising ⅛ inch split ring washers was used to filter suspended solids from the wastewater. This pilot test was conducted over a one month period beginning on Aug. 18, 1995. The filter was operated continuously, with backwashing cycles when necessary, during the entire one month test period until final test measurement readings were taken on Sep. 18, 1995. The test results show an improvement over the first pilot test where the state-of-the-art matrix was used. After a month of service, as compared to less than 4 hours of service in the first pilot test, the split ring washer matrix continued to discharge an effluent having a suspended solids measurement of only 76.

As illustrated in FIG. 2, one of the baffles, either 19 or 20, is removably attached to canister 12 to provide means for charging the canister with matrix material 13. In the preferred embodiment baffle 20 is shown threaded to the discharge side end 15 of canister 12 to provide access to the interior space 21 of canister 12. This enables operators to either charge or remove matrix material. It should be understood, however, that baffle 19, or both baffle 19 and 20, can be removably attached to canister 12 without departing from the scope of this invention.

The interior space 21 of canister 12 is charged with a suitable amount of matrix material, split ring lock washers 13, to provide a gap 22 between the top layer 13A of the matrix and the bottom surface 20A of the discharge side baffle 20. Gap 22 is provided to allow space for fluidizing the matrix during backwashing operations. Baffles 19 and 20 contain the matrix within the interior space 21 of canister 12 and prevent the matrix from being washed into either the feed or discharge lines 18 and 17 respectively. The split ring lock washers completely fill interior space 21 from the floor 19A of baffle 19 to the top layer 13A of the matrix, and the completely filled space prevents wastewater from short circuiting around matrix.

During our pilot tests it was discovered that a minimum gap 22 of one inch between the top layer 13A of the matrix and the bottom surface 20A of the baffle 20 will provide adequate space to fluidize the matrix during up-flow backwashing operations. It was also discovered that a preferred gap 22 measuring two inches provides the best matrix fluidizing results for during the up-flow backwash cycle, and that increasing gap 22 to larger than two inches provided no improved results. Increasing the gap 22 to more than two inches only results in making the filter more expensive to manufacture.

Referring now to FIG. 4, the preferred electromagnetic filter system "S" is shown comprising an electromagnetic filter "B" having a header 16, a discharge line 17 and a feed line 18. During filtering operations valve 24 is open and valves 25 and 26 are closed. The magnet coil 11, shown in FIG. 2, is energized and wastewater from the HSM collection point (not shown), is fed or pumped through line 23, valve 24 and feed line 18 where it is directed into the matrix canister shown in FIG. 2. The magnetic field of the matrix separates the oily ferromagnetic solids from the wastewater, and the wastewater is filtered through the matrix and the filtrate is discharged through line 17. Directional valve 27 is rotated to direct the filtered water back into the cooling water stream of the HSM via line 28.

TABLE A

ERIEZ MAGNET — 2,500 Gauss — 25 gpm — Compressed, Expanded Metal Matrix
Suspended Solids Concentration at Time Into Run in Minutes

| | 5 min. | | 15 min. | | 25 min. | | 35 min. | | 45 min. | | 55 min. | |
|---|---|---|---|---|---|---|---|---|---|---|---|---|
| RUN NO. | Influent | Effluent | Influent | Effluent | Influent | Effluent | Influent | Effluent | Influent | Effluent | Influent | Effluent |
| 1 | 212 | 36 | 160 | 45 | 184 | 38 | 228 | 43 | 208 | 63 | 180 | 92 |
| 4 | 296 | 33 | 304 | 34 | 296 | 51 | 344 | 82 | 324 | 257 | — | — |

TABLE B

ERIEZ MAGNET — 2,500 Gauss — 25 gpm — ⅛ Inch Split Ring Washer Matrix
Suspended Solids Concentration at Time Into Run in Minutes

| RUN NO. | 5 min. | | 15 min. | | 25 min. | | 35 min. | | 45 min. | | 55 min. | |
|---|---|---|---|---|---|---|---|---|---|---|---|---|
| | Influent | Effluent | Influent | Effluent | Influent | Effluent | Influent | Effluent | Influent | Effluent | Influent | Effluent |
| 8/18/96 | 250 | 17 | 246 | 33 | 227 | 47 | 223 | 54 | 243 | 69 | 227 | 80 |
| 9/18/96 | 196 | 22 | 199 | 29 | 195 | 39 | 202 | 53 | 198 | 64 | 196 | 76 |

Figure 5:
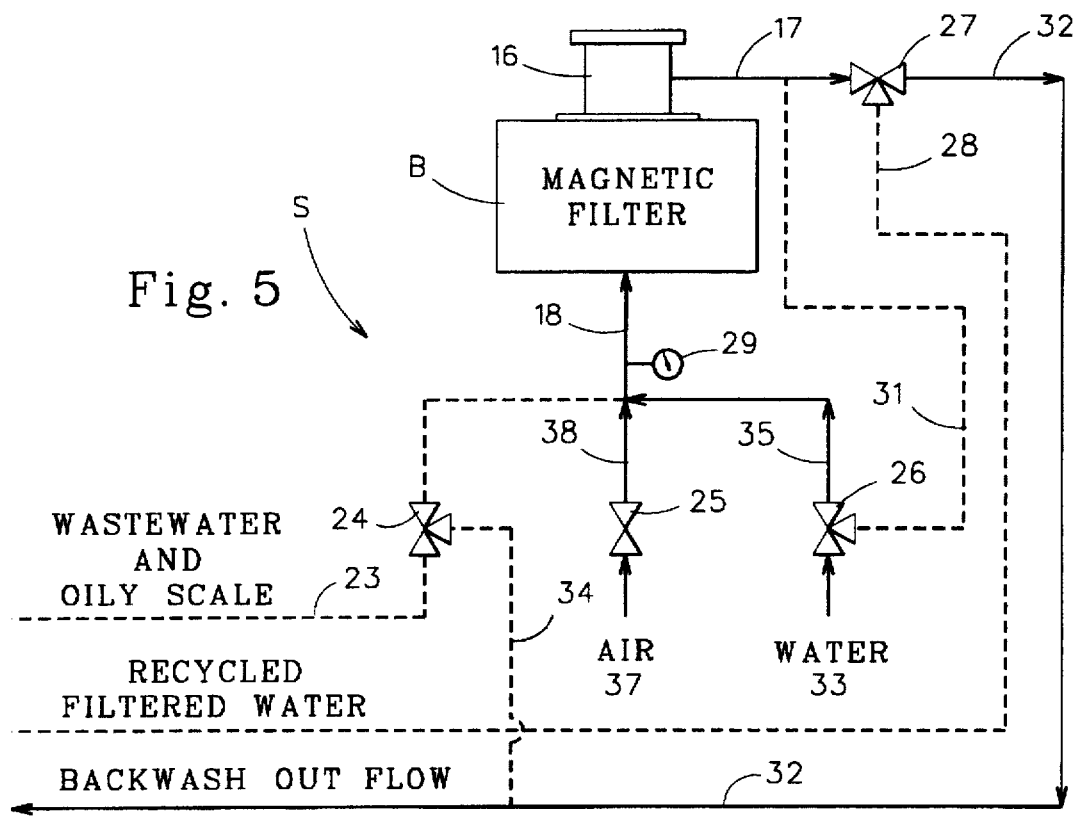
FIG. 5 is a flow diagram similar to FIG. 4 showing a first backwash cycle.
Figure 6:
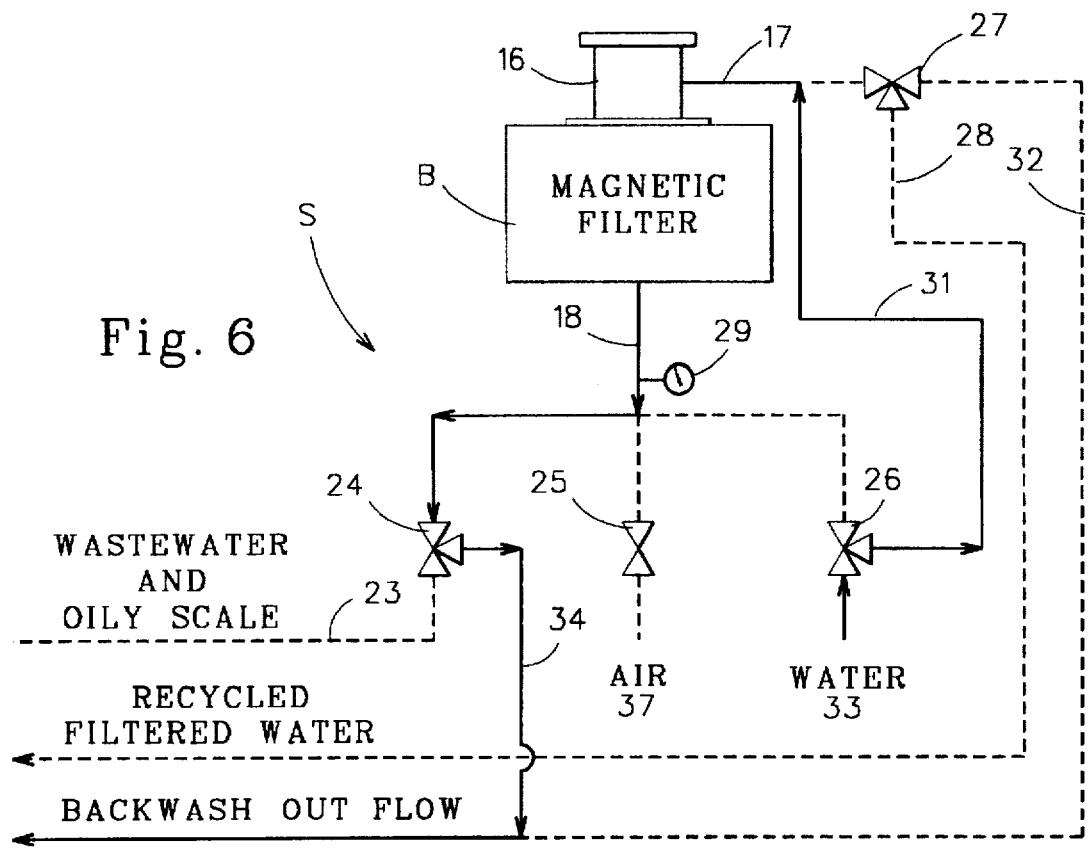
FIG. 6 is a flow diagram similar to FIG. 4 showing a second backwash cycle.

As more and more oily solids are collected in the matrix, the efficiency of the electromagnetic filter system begins to decrease. The drop off in efficiency is indicated by a rise in back pressure on gauge 29 attached to the feed side of the filter. As shown in FIG. 5, when the filtering operation reaches a selected predetermined back pressure, where the filter efficiency is no longer acceptable, the matrix is backwashed to purge the oily solids from the matrix and restore the efficiency of the filter. The backwash cycle comprises an alternating up-flow-flush and a down-flow-flush as shown in FIGS. 5 and 6 respectively. It should be understood that up-flow and down-flow are used only to distinguish between two different flow directions, and that the terms up-flow and down-flow do not necessarily indicate a vertical direction. The orientation of the up-flow-flush and down-flow-flush can be other than vertical without departing from the scope of this invention.

When it becomes necessary to purge the collected oily solids from the matrix the purging cycle begins with a down-flow-flush as shown in FIG. 6. Valve 26 is rotated to open line 31 and valve 27 turned to close the discharge lines 28 and 32. At the same time valve 24 is rotated to shut off the wastewater feed line 23 and open discharge line 34. Wash-water 33 is forced through line 31, discharge line 17 and into header 16. Referring to FIG. 2, the wash-water is forced under pressure in a down-flow-flus 14 of canister 12. The wash-water is forced through the matrix in a down-flow-flush for about 18 seconds at a rate of about 150–200 gpm per square foot of matrix cross sectional area with a preferred rate of about 175 gpm per square foot of matrix cross sectional area, and it is discharged from the electromagnetic filter "B" through feed line 18. Referring again to figure 6, during the backwash cycle valve 24 is operated to force the wash-water from feed line 18 flow through line 34 where it is discharged downstream for disposal and/or treatment.

After the down-flow-flush is completed the valves are turned to provide for the up-flow-flush of the backwash cycle. As shown in FIG. 5, valve 24 is rotated to shut off both the wastewater feed line 23 and discharge line 34. Valve 27 is rotated to close off line 28 to the HSM cooling water stream and open discharge line 32, and valve 26 is rotated to redirect the wash-water supply 33 from line 31 to line 35. Valve 25, connected to an air supply 37, is opened to supply air to the up-flow-flush. The air is supplied through line 38 and is mixed with the incoming wash-water 33 prior to its injection into the matrix canister house within electromagnetic filter "B". The mixture of air and wash-water is injected into the matrix canister feed line 18 and is discharged for further treatment and disposal through header 16 line 17, valve 27 and discharge line 32. The air/water mixture is injected into the matrix canister for a period of about 18 seconds at a flow rate of about 100–130 gpm per square foot of matrix cross sectional area at volume about 75 SCFM per square foot of matrix cross sectional area.

Referring now to FIG. 3, as the air/water mixture is injected into canister 12 through line 18, the matrix becomes fluidized, as shown at 13b, filling the entire interior space 21 of the canister, including the volumetric space that was gap 22 in FIG. 2. The injected air increases the velocity of the combined fluids within the matrix canister and causes the matrix material to become fluidized thereby agitating or churning the matrix and causing collisions that knock free the oily scale and solids that adhere to the matrix. Although most of the tested matrix materials appeared to work to some degree, only the split ring lock washers satisfied all the criteria "a" through "d" determined above for the matrix. The pilot scale tests that used split ring lock washers as matrix showed immediate and dramatic results.

A complete backwash cycle includes alternating three down-flow-flushes with two up-flow-flushes, beginning the backwash with a down-flow flush and ending the backwash cycle with the third down-flow flush. The electromagnetic coil is deactivated and a first flush cycle is initiated. The first flush cycle consists of 18 seconds of down-flow-flush at a wash-water flow rate of about 150–200 gpm per square foot of matrix cross sectional area. The second flush cycle consists of 18 seconds of up-flow-flush comprising an air/water mixture at a rate of about 100–130 gpm of water per square of matrix cross sectional area and about 75 SCFM of air per square foot of matrix cross sectional area. The valves and feed and discharge lines are set as shown in FIGS. 6 and 5 respectively for the first and second flushes. The third flush cycle consists of 18 seconds of down-flow-flush at a wash-water flow rate of about 150–200 gpm per square foot of matrix cross sectional area. The fourth flush cycle consists of 18 seconds of up-flow-flush comprising an air/water mixture at a rate of about 100–130 gpm of water per square foot of matrix cross sectional area and about 75 SCFM of air per square foot of matrix cross sectional area. Again, the valves and feed and discharge lines are set as shown in FIGS. 6 and 5 respectively for the third and fourth flushes. And finally, the fourth flush cycle is followed by the fifth flush cycle that also consists of 18 seconds of down-flow-flush at a wash-water flow rate of about 150–200 gpm per square foot of matrix cross sectional area. The valves and feed and discharge lines are set as shown in FIG. 6.

Figure 7:
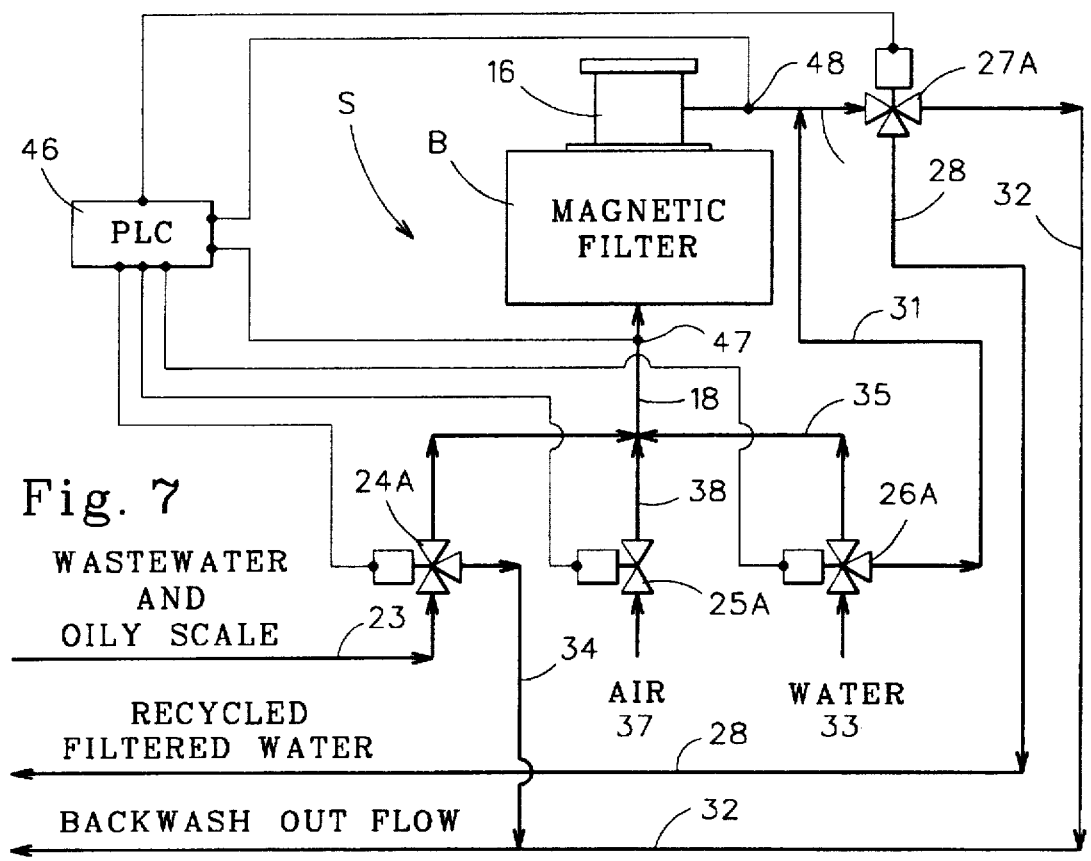
FIG. 7 is a flow diagram similar to FIG. 4 showing means for automatically controlling filtering and backwash cycles.
Figure 8:
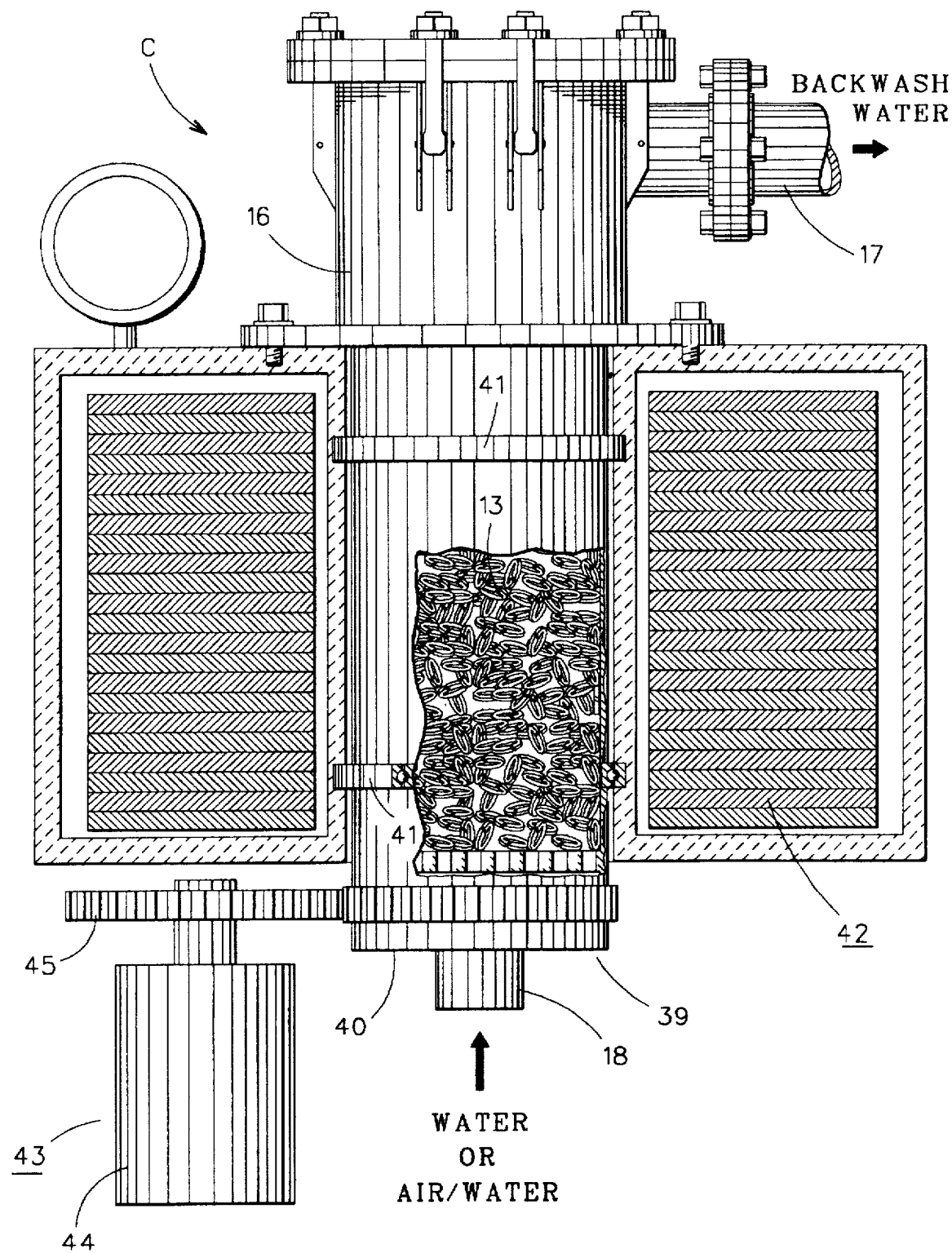
FIG. 8 is a cross-sectional view showing an alternate embodiment of the invention.

Referring to FIG. 8, an alternate embodiment, shows an electromagnetic filter "C" having a mechanical means 39 to agitate the matrix material 13 contained within a matrix canister 40. The matrix canister 40 is rotatably positioned by bearings 41, or the like, within the core of the electromagnetic coil 42 that encircles the matrix canister 40. Canister 40 is fastened by rotatable joints or couplings to the wastewater feed line 18 and the header 16 of the electro-magnetic filter "C", and a drive means 43 is attached to canister 40 to rotate it about its longitudinal axis within the core of the electromagnetic coil 42. The drive means may comprise a motor 44 and gear arrangement 45. A chain and sprocket drive, or any other like drive means capable of rotating canister 40 within the core of the electromagnetic coil can be used for a drive train, and the electromagnetic filter "C" can be used with the filter system "S" shown in FIGS. 4–7.

Referring now to FIG. 7, an automatic electromagnetic filter system "S" is shown comprising a programmable logic controller 46 (PLC), that receives a signal from either a pressure sensor 47 located on the feed side of the filter system "S", or from a turbidity sensor 48 located on the discharge side of the filter system "S", or both, to control the filter and backwash cycles described and shown in FIGS. 4–6.

Under normal filter operating conditions, as previously shown in FIG. 4, automatic valve 24A is rotated to shut off discharge line 34 and open wastewater feed line 23 from the wastewater collection site. The automatic valves 25A and 26A are positioned to close off the air and wash-water supplies 37 and 33 respectively, and the automatic valve 27A is operated to direct the filtered water through line 28 for recycling back into the cooling water stream of the HSM.

The pressure sensor 47 sends electrical signals to the PLC 46 throughout the filtering operation. The signals are processed to monitor the water pressure on the feed side of the filter to determine when a backwash cycle should begin. The PLC is programmed to start a backwash cycle when a predetermined pressure measurement signal is received from the pressor sensor 47. Similarly, the PLC is programmed to start a backwash cycle when a predetermined increase in the turbidity is determined from electrical signals received from the flow sensor 48 located on the discharge side of the filter system. When such predetermined signals are received from either of the sensors, the PLC program sends electrical signals to the automatic valves 24A, 26A, and 27A to open and close the feed and discharge lines as described for FIG. 6 to provide a down-flow-flush of wash-water 33 through the matrix contained in the electromagnetic filter "B". The PLC sends a signal to automatic valve 26A to open line 31 to provide wash-water 33 for the down-flow-flush and a signal to automatic valve 24A to shut off line 23 and open line 34 to discharge the wash-water for further treatment and disposal through line 34. Additionally, the PLC sends a signal to automatic valve 27A to shut off the discharge line 28 to the cooling water stream of the HSM, and to shut off the discharge line 32 to the treatment and disposal site (not shown).

After a predetermined period of time, about 18 seconds in the preferred method for backwashing the matrix, the PLC program sends electrical signals to the automatic valves 24A–27A to open and close the proper valves and provide an up-flow-flush in the backwash cycle. The valves are opened and closed on the feed and discharge lines as described for FIG. 5. The PLC sends an electrical single to the automatic valve 24A to shut off the wastewater line 23 and discharge line 34, and it sends an electrical signal to automatic valve 27A to open the discharge line 32 and provide a disposal stream to the treatment and disposal site. The discharge line 28 to the cooling water stream of the HSM remains closed. The PLC program also sends an electrical signal to the automatic valve 26A, that controls the wash-water supply, to operate to shut off feed line 31 and open feed line 35 attached to feed lines 18 and 38. An electrical signal from the PLC also causes the automatic valve 25A, that controls the air supply, to operate to open line 38 to mix air 37 with the incoming wash-water 33 prior to injection into the matrix canister contained within the electromagnetic filter "B".

After about 18 seconds, as described in the above preferred method for backwashing the matrix, the PLC program sends electrical signals to the automatic valves 24A–27A to operate the valves to open and close the feed and discharge lines as described for FIG. 6 to provide a down-flow-flush of wash-water 33 through the matrix. The PLC continues to send the electrical signals in the above described manner to provide alternating down-flow-flushes of wash-water 33 and up-flow-flushes of an air/wash-water mixture 37/33 during the backwash cycle. In the preferred method for backwashing the matrix, the backwash cycle comprises three down-flow-flushes of wash-water 33 and two up-flow-flushes of air/wash-water 37/33 as described above.

After the last or third down-flow-flush of wash-water, the PLC program sends electrical signals to operate the automatic valves 24A–27A and open and close the feed and discharge lines as described for FIG. 4 above, and normal filtering operations of the HSM wastewater resumes.

As such, the invention has been disclosed in terms of preferred and alternate embodiments thereof which fulfill each and every one of the objects of the present invention as set forth hereinabove and provides an improved apparatus, system and method for filtering oily scale and solids from wastewaters.

Although the embodiments disclose removing oily scale and solids from HSM wastewaters, the apparatus, system and method may be used in other applications where wastewaters contain oily solids and sludges, and therefore, various changes, modifications and alterations from the teaching of the present invention may be contemplated by those skilled in art without departing from the intended spirit and scope thereof. Accordingly, it is not intended that the present invention should be limited by the terms of the appended claims.

We claim:

1. An electro-magnetic filter system for separating and removing oily magnetic solids from wastewaters comprising:
   a) a filter assembly including:
      I) an electromagnetic coil having a core, and
      ii) a canister positioned within the core of the electromagnetic coil, said canister including an interior space defined by a wall surface and an upper perforated baffle spaced apart from a lower perforated baffle, said interior space containing a ferromagnetic matrix comprising washers disposed between said upper perforated baffle and said lower perforated baffle,
   b) a feed line having an open end adjacent a lower surface of said lower perforated baffle, said feed line having a pipe arrangement for selectively communicating with a wastewater source that contains oily magnetic solids, a wash-water supply, a pressurized air supply, and a disposal stream, and
   c) a discharge line having an open end adjacent an upper side of said upper perforated baffle, said discharge line having a pipe arrangement for selectively communicating with a recycling stream, the disposal stream, and the wash water supply.

2. The electro-magnetic filter recited in claim 1 further comprising:
   a) a feed side valve arrangement adapted to;
      i) selectively introduce wastewater from the wastewater source into said feed line, and
      ii) selectively inject a pressurized air/wash-water mixture from the wash-water supply and the pressurized air supply into said feed line.

3. The electro-magnetic filter recited in claim 2 further comprising:

a) a discharge side valve arrangement adapted to;
   i) selectively discharge a filtrate from said discharge line into said recycling stream simultaneous with the introduction of the wastewater into said feed line, and
   ii) selectively discharge said pressurized air/wash-water mixture from said discharge line into said disposal stream simultaneous with the injection of said pressurized air/wash-water mixture into said feed side end portion.

4. The electro-magnetic filter recited in claim 3 wherein:

a) said feed line communicates with the discharge stream and said discharge line communicates with the wash-water supply, b) said discharge side valve arrangement is adapted to selectively inject wash-water from the wash-water supply into said discharge line, and c) said feed side valve arrangement is adapted to selectively discharge the wash-water from said feed line into the discharge stream.

5. The electro-magnetic filter recited in claim 4 further including:

a) a sensor to monitor feed side pressure in said feed line, b) a controller programmed to receive and process electrical signals from said sensor that monitors the feed side line pressure, said controller being programmed to;
   i) automatically operate said feed side valve arrangement in response to an electrical signal indicating that said sensor detected a preselected feed side pressure level in said feed line, and
   ii) automatically operate said discharge side valve arrangement in response to an electrical signal indicating that said sensor detected preselected feed side pressure level.

6. The electro-magnetic filter recited in claim 4 further including:

a) a sensor to monitor discharge side turbidity in said discharge line, b) a controller programmed to receive and process electrical signals from said sensor that monitors the discharge side turbidity, said controller being programmed to;
   i) automatically operate said feed side valve a arrangement in response to an electrical signal indicating that said sensor detected a preselected discharge side turbidity in said discharge line, and
   ii) automatically operate said discharge side valve arrangement in response to an electrical signal indicating that said sensor detected said preselected discharge side turbidity.

7. The electro-magnetic filter recited in claim 1 wherein said washers comprise split ring lock washers.

8. The electro-magnetic filter recited in claim 1 wherein said washer comprise ⅛ inch diameter split ring lock washers.

9. An electro-magnetic filter for separating and removing oily magnetic solids from wastewaters comprising:

a) a filter assembly including an electro-magnetic coil having a core, and b) a canister positioned within the core of the electro-magnetic coil, said canister including an interior space defined by a wall surface, and a first perforated baffle spaced apart from a second perforated baffle, said interior space containing a ferromagnetic matrix comprising split ring lock washers.

10. The electromagnetic filter recited in claim 9 wherein said ferromagnetic matrix comprises ⅛ inch diameter split ring lock washers.

11. The electro-magnetic filter recited in claim 9 including means to fluidize said ferromagnetic matrix during a backwash cycle.

12. The electromagnetic filter recited in claim 11 wherein said means to fluidize said ferromagnetic matrix includes a valve arrangement to inject a pressurized air/wash-water mixture into said interior space of said canister.

13. The electromagnetic filter recited in claim 11 wherein said means to fluidize said ferromagnetic matrix includes a drive means to rotate said canister within the core of said electro-magnetic coil.

14. The electro-magnetic filter recited in claim 11 wherein said means to fluidize said ferromagnetic matrix includes a valve arrangement to inject a pressurized air/wash-water mixture into said interior space of said canister and a drive means to rotate said canister within the core of said electro-magnetic coil.

\* \* \* \* \*